United States Patent
Bennett et al.

(10) Patent No.: US 11,348,091 B2
(45) Date of Patent: *May 31, 2022

(54) SYSTEM AND METHOD FOR FACILITATING A PURCHASE TRANSACTION VIA A MERCHANT'S FOREIGN WEBSITE

(71) Applicant: Blackhawk Network, Inc., Pleasanton, CA (US)

(72) Inventors: Andrew Bennett, Pleasanton, CA (US); David Tate, Los Gatos, CA (US)

(73) Assignee: Blackhawk Network, Inc., Pleasanton, CA (US)

( * ) Notice: Subject to any disclaimer, the term of this patent is extended or adjusted under 35 U.S.C. 154(b) by 133 days.

This patent is subject to a terminal disclaimer.

(21) Appl. No.: 16/376,527

(22) Filed: Apr. 5, 2019

(65) Prior Publication Data

US 2020/0104827 A1    Apr. 2, 2020

Related U.S. Application Data

(63) Continuation of application No. 15/440,190, filed on Feb. 23, 2017, now Pat. No. 10,282,725.

(60) Provisional application No. 62/301,387, filed on Feb. 29, 2016.

(51) Int. Cl.
G06Q 40/00 (2012.01)
G06Q 20/34 (2012.01)
G06Q 20/38 (2012.01)
G06Q 20/40 (2012.01)

(52) U.S. Cl.
CPC .......... *G06Q 20/34* (2013.01); *G06Q 20/381* (2013.01); *G06Q 20/40* (2013.01)

(58) Field of Classification Search
CPC .................................................. G06Q 40/00
USPC ........................................................ 705/44
See application file for complete search history.

(56) References Cited

U.S. PATENT DOCUMENTS

2009/0192939 A1* 7/2009 Salemi ................... G06Q 20/40
705/44

* cited by examiner

Primary Examiner — Ojo O Oyebisi
(74) Attorney, Agent, or Firm — Barnes & Thornburg LLP; Jerry C. Harris, Jr.

(57) ABSTRACT

A computer implemented system and method for facilitating a consumer's purchase transaction via a merchant's foreign website utilizes a stored value card transformation computer to convert a stored value card to a different denomination for utilization in another country. An exchange computer retrieves a value rate to calculate the currency different and a time-limited quote is generated which may be transformed into active stored credit in the selected denomination.

26 Claims, 10 Drawing Sheets

Review your exchange

Card Value $500.00 AUD
Foreign transaction fee $25.00 AUD
Locked-in exchange rate 1.00 AUD = 0.766985 USD Total amount $375.18 USD Total $375.18 USD to be used on domain.com in United States Email of recipient Terms and Conditions ☐ I agree to terms and conditions Back    Confirm Your Exchange

FIG. 9

SYSTEM AND METHOD FOR FACILITATING A PURCHASE TRANSACTION VIA A MERCHANT'S FOREIGN WEBSITE

CROSS-REFERENCE TO RELATED APPLICATIONS

This application is a continuation of, and claims priority to, U.S. patent application Ser. No. 15/440,190 filed on Feb. 23, 2017, which is a continuation application of and claims priority to U.S. Provisional Application No. 62/301,387, filed Feb. 29, 2016, entitled "Systems and Methods for Facilitating Foreign Online Transactions," which is hereby incorporated by reference for all purposes.

FIELD

The present invention generally relates to a processing and activation system providing consumers with the ability to purchase a stored value card, e.g., a gift card, a prepaid card, a loyalty card, a membership card, a ticket card, an entertainment card, a sports card, a prepaid communications card, and the like, of various affiliated or non-affiliated service providers with additional value added beyond the purchase price.

BACKGROUND

The market for stored value cards such as merchant gift cards continues to grow. The marketplace is currently filled with many types of stored value cards offered by numerous card issuers. Some of the cards are tailored to be redeemed from a single merchant while others may be redeemed by several merchants. Because the consumer has numerous choices in selecting a stored value card, such as a gift card, it is becoming increasingly difficult for card issuers to distinguish themselves in the marketplace from other issuers of stored value cards. Therefore, it would be desirable to have a method and system that provided card issuers and redeeming merchants a mechanism for distinguishing their card and/or store in order to encourage a consumer to purchase a stored value card from them or redeem a stored value card with them.

Consumer use of stored value cards typically involves a card vendor, a redeeming merchant, and a card issuer. In various embodiments, the card vendor, redeeming merchant and card issuer may be the same, different, or related entities. The point of sale where stored value cards are purchased and activated may be referred to as the card vendor or simply vendor. An entity that will accept a stored value card for business transactions, for example as tender for a purchase, may be referred to as a redeeming merchant. An entity that provides the financial backing and/or payment processing accessed via the stored value card may be referred to as the card issuer or simply issuer.

Typically, the issuer is identified on the stored value card and associates a unique issuer account code with each stored value card. Card issuers include direct issuers of cards such as store-branded cards, and in some embodiments the card vendor may also be the card issuer and/or the redeeming merchant. Card issuers also include banks, financial institutions, and transaction processors such as VISA, MasterCard, American Express, etc., and cards issued by such institutions may be readily accepted by a number of redeeming merchants to conduct transactions such as purchases. In some instances, the redeeming merchant may be identified on the stored value card (for example, a retailer branded card such as Store X), and such cards may be sold at the same or different card vendor (e.g., card vendor is Store X or a different or unrelated Store Z). In such instances, the Store X branded stored value card may be issued by Store X, by Store Z, or by a third party such as bank or financial institution. Customers may be offered incentives to purchase and/or redeem a card (or cards) via value differentiation between the purchase and redemption values of said card (or cards).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 9 illustrates an embodiment of a user interface 900.

DETAILED DESCRIPTION

"Stored value card" in this context refers to a transaction device that may be used to transact business with a party willing to accept the card, for example as tender for a purchase. Examples of such cards include gift cards, prepaid telephone cards, loyalty cards, membership cards, ticket cards, entertainment cards, sports cards, prepaid cards, and the like. Typically, such cards are wallet-sized and made of plastic. In various embodiments, the transaction card may be a type of card such as a gift or prepaid card that requires activation at a point of sale. For example, a stored value card may be purchased and activated at a point of sale by a consumer and subsequently used by the consumer or another (e.g., the recipient of the card as a gift) to transact business.

The ordering of steps in the various processes, data flows, and flowcharts presented are for illustration purposes and do not necessarily reflect the order that various steps must be performed. The steps may be rearranged in different orders in different embodiments to reflect the needs, desires and preferences of the entity implementing the systems. Furthermore, many steps may be performed simultaneously with other steps in some embodiments. Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

Described herein are embodiments of a stored value card transaction system that allows consumers to transform the value of a stored value card from one denomination to another. It will be apparent to those skilled in the art that modifications may be made without departing from the spirit and scope of the invention. The embodiments described are representative only, and are not intended to be limiting. Many variations, combinations, and modifications of the applications disclosed herein are possible and are within the scope of the invention. Accordingly, the scope of protection is not limited by the description set out above, but is defined by the claims which follow, that scope including all equivalents of the subject matter of the claims.

Figure 1:
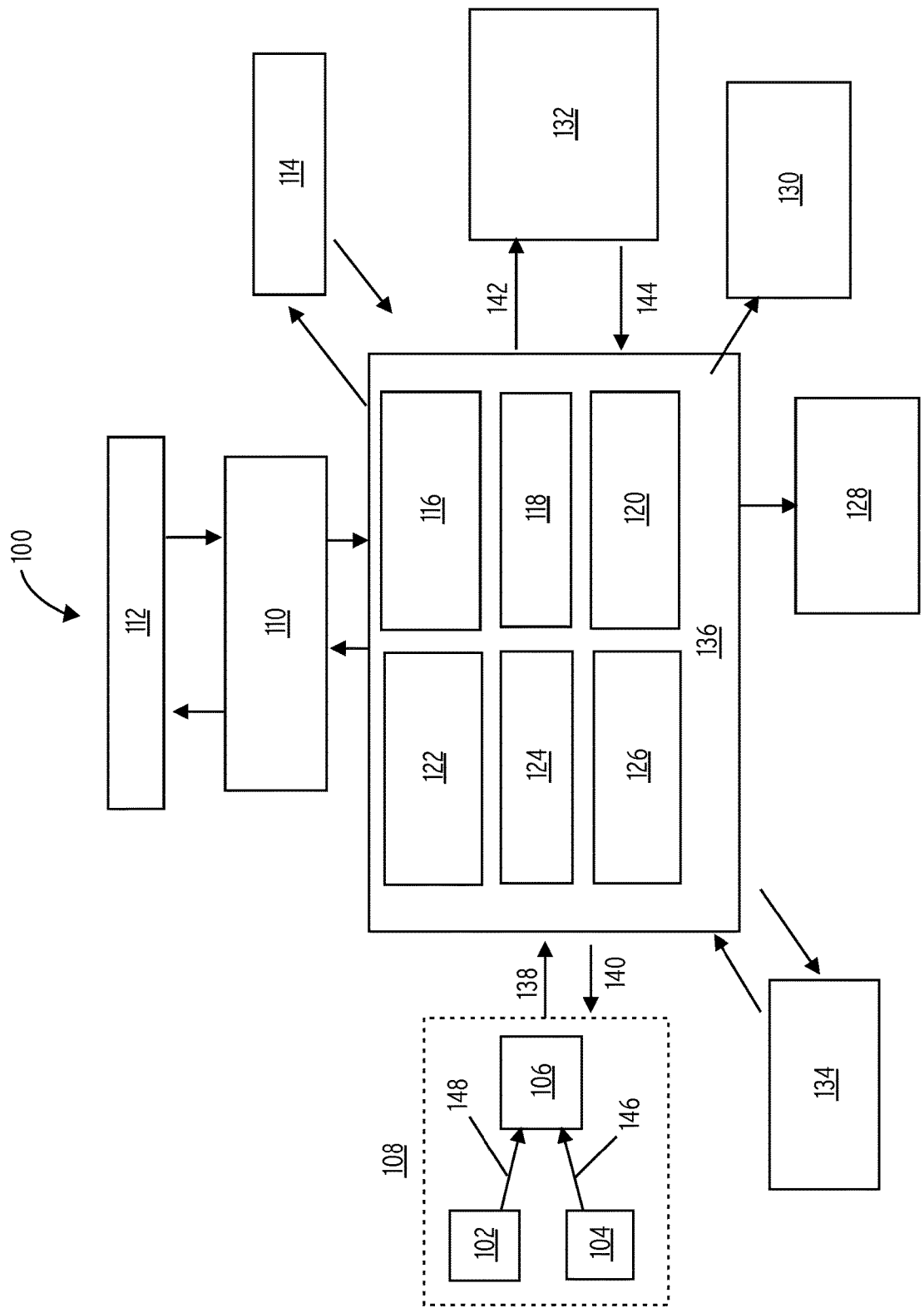
FIG. 1 illustrates an embodiment of a stored value card transaction system 100.

FIG. 1 illustrates an exemplary stored value card transaction system 100 in accordance with one embodiment of the present invention. In one embodiment, the stored value card transaction system comprises: (a) at least one point of sale component 108; (b) a stored value card transaction computer 136; (c) a datastore 110 containing stored value card identifiers, stored value card account information, value added award conditions (herein "value added award" is synonymous with "value added bonus," "value added bonus award," "value added award bonus," and "value differentiation"), and other information related to activating, redeeming, and managing stored value cards, and other information related to activating, redeeming, and managing stored value cards; (d) at least one individual card issuers' card issuer authorization system 132; and (e) any other component included in the system by the stored-value card transaction computer administrator 114.

In one embodiment, the stored value card transaction computer 136 comprises a value added determination component 122, a POS interface POS interface 124, a message modification component 116, a reconciliation component 118, a card issuer system interface 120, and an authorization component 126.

The POS Interface reconciliation component 118 provides a means for the stored value card transaction computer 136 to communicate with the point of sale component 108 via, for example, the Internet, a Public Switched Telephone Network (PSTN), or an independent dedicated network. Likewise, the stored value card transaction computer 136 may communicate with the card issuers' card issuer authorization system 132 via, for example, the Internet, a Public Switched Telephone Network (PSTN), or an independent dedicated network. Communications message 138, message 140 between the POS interface 124 and the point of sale component 108 and communications message 142, message 144 between the card issuer system interface 120 and the card issuers' authorization systems 160 may be encrypted for added security and/or may utilize a virtual private network (VPN).

A point of sale component 108 (typically located at a vendor and/or redeeming merchant), the card identifier on the stored value card is interpreted by a point of sale interpretation component 102 (e.g., a card reader). The point of sale interpretation component 102 can comprise a human, a bar code scanner, magnetic strip reader, optical character recognition device, or other device configured to interpret the data encoded in the card identifier on the stored value card.

Contemporaneously with the interpretation of the card identifier, a request for activation, deactivation, or redemption item 146 by a point of sale transaction component 104 is made. The point of sale transaction component 104 may comprise a human, an electronic input device, a register, a computer processing unit ("CPU"), or other means of requesting the activation or deactivation of the stored value card identifier interpreted by the point of sale interpretation component 102. In some embodiments, the actions performed by the point of sale interpretation component 102 and the point of sale transaction component 104 may be performed by one component capable of performing both actions that would be performed by the individual components.

The point of sale interpretation component 102 and the point of sale transaction component 104 communicate with the point of sale processing component 106. The point of sale processing component 106 can comprise a CPU or other type of processing device accepted for use in the industry. The point of sale interpretation component 102 communicates the card identifier to the point of sale processing component 106. The point of sale transaction component 104 communicates the request for activation or deactivation of the card identifier interpreted by the point of sale interpretation component 102 to the point of sale processing component 106. The point of sale processing component 106 communicates with the stored value card transaction computer 136 (e.g., transmits a message requesting card activation, deactivation or redemption).

In some embodiments, the actions performed by the point of sale interpretation component 102, the point of sale transaction component 104, and the point of sale processing component 106 may all be performed by one component (e.g., an integrated POS device such as a computerized register) capable of performing all the actions that would be performed by the individual components.

The point of sale processing component 106 is connectable to the stored value card transaction computer 136 via a suitable network, such as the Internet, the public switched telephone network (PSTN), or an independent dedicated network. Each point of sale processing component 106 has an associated identifier that may be transmitted to the stored value card transaction computer 136 during the course of connecting the point of sale processing component 106 to the stored value card transaction computer 136. Each point of sale processing component 106 may include multiple point of sale transaction components point of sale interpretation component 102, point of sale transaction component 104 corresponding to individual terminals each with its own terminal identification.

The stored value card transaction computer 136 is configured to: (a) form a secure connection with the card vendor (e.g., via the point of sale component 108), the card issuers' card issuer authorization system 132, and any other entities granted access 134 authorized to access the stored value card transaction computer 136 by the stored value card transaction computer administrator 114; (b) to communicate with card issuers' authorization systems 160 to request and receive activation or deactivation of stored value cards as well as receive value added information for stored-value cards that are eligible for incentives; (c) to communicate with card issuers' authorization systems 160 to redeem all or a portion of the value, services, or products associated with the stored-value card; (d) generate and maintain a transaction log 128 of all activities performed; (e) generate and maintain an error log 130 of all activities unsuccessfully completed and reasons therefor; (f) communicate to the card vendor (e.g., via the point of sale component 108) the activation or deactivation of the stored value card and any information concomitant with the activation or deactivation of individual stored value card, i.e. the communication of PINs associated with activated stored value cards; and (g) communicate to the card vendor (e.g., via the point of sale component 108) any reasons why requested transactions cannot not be completed.

The stored value card transaction computer 136 may comprise a singular processing unit (e.g., a centralized server or data center), a plurality of processing units (e.g., a distributed computing system with various components distributed and in communication with each other), or combinations thereof, with concomitant storage capabilities, each capable of or designated for: accessing the datastore 110; creating a transaction log 128; creating and maintaining an error log 130; communicating with card vendors; communicating with the individual card issuers' authorization systems 160; processing individual transaction card activation and or deactivation requests; processing stored value card redemption requests, processing value added functions to add additional cash value or add an electronic redemption coupon for a specific product(s) or service(s), processing redemption request for electronic redemption coupons for specific product(s) and/or service(s), and communicating with other entities granted access 134 capable of and authorized to communicate with the stored value card transaction computer 136.

Datastore 110 maintains records of accounts associated with each stored value card indicating: (a) whether each individual card has been activated or deactivated, (b) whether the card has been redeemed, (c) records and details of each individual redemption request, (d) the amount remaining on the card, (e) conditions required for activation and redeeming the card, (f) identity of the card issuer, (f) value added bonus awards, (g) conditions for redeeming value added bonus awards, and (h) any combination thereof. The datastore may also maintain records of conditions required for granting a value added bonus award to a stored value card.

The stored value card transaction computer 136 is also configured to generate and maintain a transaction log 128 of all activity involving the stored value card transaction computer 136. The transaction log may comprise a detailed summary of: (a) requested stored-value card activations; (b) requested stored-value card deactivations; (c) the monetary amount ascribed to card activations; (d) the monetary amount ascribed to card deactivations; (e) the value added amounts, products, or services ascribed card activations; (f) the value added amounts, products, or services ascribed to card deactivations; (g) the time the cards were activated; (h) the time the cards were deactivated; (i) the transaction or communication performed with the card issuer to activate the cards; (j) the transaction or communication performed with the card issuer to deactivate the cards; (k) the PIN communicated to the card vendor in response to a request to activate a card requiring the input of a PIN for use; (l) any other information the administrator 114 directs the stored value card transaction computer 136 to maintain as a log entry; and (m) any combination thereof.

The information contained in the transaction log 128 may be used to generate reconciliation reports, settlement reports, payment reports, audit reports, or other forms of information aggregation for the benefit of, use by, or for provision to, the stored value card transaction administrator 114, the datastore administrator 112, card vendors, card issuers, card issuers' authorization systems 160, redeeming merchants, or other interested parties. For example, the transaction log 128 contains information about each transaction performed by stored value card transaction computer 136 and may be utilized by the reconciliation component 118 when reconciling accounts belonging to various vendors, merchants, card issuers and the stored value card transaction system administrator.

Oversight and maintenance of the stored value card transaction computer is performed by the stored value card transaction computer administrator 114. Although not required, in an alternative embodiment, the stored value card transaction computer administrator 114 may also function as the datastore administrator 112. The stored value card transaction computer 136 is configured to generate and maintain an error log of all transactions that were not completed and reasons therefor. In some embodiments, the error log is administered by the stored value card transaction computer administrator 114.

As noted above, the stored value card transaction computer 136 may communicate with the datastore 110 and/or the card issuers' authorization systems 160 to determine whether the stored value card to be activated is eligible for a value added award. The stored value card transaction computer 136 may compare one or more of the card identification, the terminal identification, vendor identification, and the time and date of the activation request contained within the activation request to data contained in the datastore 110 to determine whether the stored value card to be activated is eligible for a value added award. For example, a particular card issuer may run a promotion to encourage customers to purchase its stored value card in which cards issued by that card issuer that are purchased within a specified period of time receive a $5 bonus added to the stored value card in addition to the purchase price for the card. Thus, a $25 gift card may be purchased for $25, but be authorized for $30. In another example, a vendor may run a promotion to encourage customers to purchase a stored value card, wherein stored value cards purchased within a specified period of time may be purchased for a price less than the value designated by the stored value card's markings and/or packaging. Thus, a customer could purchase a $25 gift card for some amount less than $25, e.g., $20. In either of the above examples, the value differentiators, e.g., bonus added to a redemption value of a stored value card and reduction of purchase price for a designated value of a stored value card, may be applicable to bundled stored value card packages and the value differentiators distributed amongst and/or across the cards, either equally or disproportionately.

Upon receipt of an activation or deactivation request for a stored-value card from the card vendor, the stored value card transaction computer stored value card transaction computer 136 accesses the datastore 110 of stored value card identifier data. The stored value card transaction computer stored value card transaction computer 136 processes the information contained in the datastore 110 and communicates message 142, message 144 with the individual card issuers' authorization systems 160 to effectuate activation or deactivation of the transaction cards secured by the package as well as to effectuate the addition of a value added service, product, or cash value amount. The stored value card transaction computer's stored value card transaction computer 136 communication with the individual card issuers' authorization systems 160 may occur simultaneously or independently. The stored value card transaction computer stored value card transaction computer 136 is connectable to the individual card issuers' authorization systems as via a suitable network, such as the PSTN, the Internet, or an independent dedicated network. The stored value card transaction computer stored value card transaction computer 136 is configured to receive communication message 144 from the card issuers' authorization systems 160 concerning the status of the activation or deactivation of individual transaction cards. The stored value card transaction computer stored value card transaction computer 136 is also configured to communicate to the card vendor 107 the status of a request for activation or deactivation of a stored-value card and to communicate any necessary PIN information required by activated stored value cards to the card vendor in order for the card purchaser to be apprised of that information for use of the purchased individual transaction card. As previously discussed, is connectable to the individual card issuers' authorization systems as via a suitable network, such as the PSTN, the Internet, or an independent dedicated network.

The stored value card transaction computer stored value card transaction computer 136 is also configured to communicate with other entities granted access 134 authorized to access the stored value card transaction system and specifically authorized to access the stored value card transaction computer stored value card transaction computer 136. These other entities may comprise third party payment management systems, third party audit systems, card issuer affiliated entities, card vendor affiliated entities, redeeming merchants or redeeming merchant affiliated entities, financial institutions, such as banks and credit unions, or any other entity provided access by the stored value card transaction computer administrator 114.

There may arise situations where an activation, deactivation, or redemption request is received by the stored value card transaction computer 136, but the information in the datastore datastore 110 pertaining to the stored value card identifier received by stored value card transaction computer 136 precludes completion of the request. For example, a card may have been previously activated, returned to the point of sale for a refund, but not deactivated prior to reshelving. In that case, when a subsequent customer purchases that card, and an activation request is communicated to the stored value card transaction computer 136, the datastore 110 file accessed by the stored value card transaction computer 136 will indicate that the card is already activated. In another example, the stored value card identifier received by the stored value card transaction computer 136 may have already been redeemed for the entire amount associated with the stored value card. In these and other similar situations, the stored value card transaction computer 136 will communicate a message to the card vendor that the transaction cannot be completed.

The value added determination component 122 uses information contained within the activation request or redemption request received from the point of sale component 108 as well as information contained in datastore 110 to determine whether the stored value card which the point of sale component 108 is attempted to have activated or redeemed is eligible for a value added award. The activation request from the point of sale component 108 may contain one or more of the following pieces of information: (a) stored value card identification, (b) point of sale terminal identification, (c) amount to be credited to an account associated with the stored value card, (d) the time of the activation request, (e) the date of the activation request, (f) identification of the card issuer for the stored value card, (g) identification of the activating vendor, (h) location of activating vendor, and (i) any combination thereof. The redemption request from the point of sale component 108 may contain one or more of the following pieces of information: (a) stored value card identification, (b) point of sale terminal identification, (c) amount to be debited from the account associated with the stored value card, (d) the time of the redemption request, (e) the date of the redemption request, (f) identification of the card issuer for the stored value card, (g) identification of the redeeming merchant, (h) location of the redeeming merchant, (i) identification of the product(s) and/or service(s) being purchased, (j) and any combination thereof. However, the information contained within the activation and redemption requests is not limited to the enumerated list but may other items in addition to the items enumerated or in place of the items enumerated above.

For an activation request, the value added determination component 122 compares the information received in the activation request to information in the datastore 110 to determine if any of the criteria for adding additional value to the stored value card or discounting the price of the stored value card to be activated are met. For example, the card issuer may have provided that stored value cards purchased during a certain period of time should receive an additional value added to the purchase amount. Alternatively, the card issuer may provide that stored value cards of a certain value or purchased during a specified time period be discounted such that the card selling vendor is only required to obtain an amount less than the face value of the card. For example, the face value of the stored value card may be $50, but the card issuer is running a promotion to encourage customers to purchase its cards by giving a $5 discount such that the purchase amount for the $50 card is only $45, but the card is activated for $50. Such a promotion may encourage a consumer to purchase the card issuer's card or encourage the consumer to purchase the card issuer's card rather than a competitor's card. Alternatively, the vendor selling the card could run a promotion in which cards purchased during a specified period of time receive an additional value added to the purchase amount of the stored value card. The vendor selling the card may not be related to the card issuer. However, by running such a promotion, the vendor selling stored value cards may encourage a consumer to purchase the stored value card from them rather than another vendor. The value added to the stored value card in excess of the purchase amount of the stored value card may be a monetary amount. For example, a $25 gift card purchased for $25 may be activated for $30-$25 purchase amount plus a $5 value added award. Thus, the gift card may be used to purchase items totaling $30 even though the consumer only paid $25 for the gift card. However, the value added to the card need not be a monetary amount, but could be an award of a specific product or service. For example, the value added could be an electronic coupon for a free product or service if the stored value card is redeemed for a specified product or service or is redeemed during a specified period of time or is redeemed with a specified merchant. Furthermore, the value added, whether it be a monetary amount or for a specific product or service, may have an expiration date that is different from the purchased amount of the stored value card. Also, the value added, may be tied to other specific redemption criteria that are different from the redemption criteria of the purchase amount of the stored value card. For example, the value added portion of the stored value card may be required to be redeemed at a specific location(s), specific merchant(s), a specific time(s), or credited toward the purchase of a specific product(s) or service(s) while the remaining portion of the stored value card may have no limitations on redemption or have different limitations on redemption.

For a redemption request, the value added determination component 122 compares the information received in the redemption request to information in the datastore 110 to determine if any of the criteria for adding additional value to the stored value card to be redeemed are met. Depending on the type of value added award specified by the card issuer or redeeming merchant, the value added, if a monetary amount, could be subtracted from the redemption amount requested or, alternatively, could be added to the account associated with the stored value card to be redeemed at a later time during a separate transaction.

The message modification component 116 modifies the message 138 and message 144 to add value added information into the messages. For example, if it is determined by the value added determination component 122 that a stored value card to be activated is eligible for a value added bonus, the activation message 138 received from the point of sale component 108 is modified by the message modification component 116 to include the determined value added bonus and is then forwarded as message 142 to the appropriate card issuers' authorization system 160 for authorizing the activation request for the amount specified in the activation request plus the value added bonus. As another example, if it is determined that the stored value card is eligible to be purchased at a discount, the activation message 138 received from the point of sale component 108 is modified by the message modification component 116 (and forwarded as message 142) to indicate to the appropriate card issuers' authorization system 160 that the stored value card to be activated will be activated for one amount, but that the customer will be charged a lesser amount reflecting the discount associated with the stored value card.

The message modification component 116 also modifies message 144 from the card issuers' authorization systems 160 intended for the point of sale component 108 to include any information regarding value added to the stored value card that may be printed on the receipt generated for the customer as well as information that may be presented to a cashier on a terminal (point of sale interpretation component 102 or point of sale transaction component 104) that the cashier may communicate to the customer, and such modified messages are forwarded as message 140 to the point of sale component 108.

The reconciliation component 118 reconciles the accounts of various card issuers, selling vendors, and/or redeeming merchants, to credit and debit appropriate merchants, vendors, the stored value card transaction system administrator, and card issuers with the value of various transactions to reflect which entities received value from which other entities. For example, if a vendor A sells a stored value card issued by card issuer B for a specified amount and receives payment from a customer, then an account associated with the stored value card is credited with the payment amount, the selling vendor receives a percentage (e.g., retains a percentage) of the purchase amount and/or a predetermined amount, the stored value card system administrator receives a percentage of the purchase amount and/or predetermined amount, and the card issuer receives the remainder. If a stored value card issued by card issuer Y is redeemed at merchant X to purchase items, then the amount redeemed is debited to the card issuer Y and credited to the merchant X, sometimes minus a transaction fee collected by the card issuer and/or a transaction fee collected by the stored value card transaction system administrator. Authorization component 126 is utilized when the stored value card transaction computer 136 is also the authorizing system such that the stored value card transaction computer 136 authorizes activation, deactivation, and redemption requests rather than transmitting the request to the card issuers' authorization systems 160 for authorization. When the authorization component 126 is utilized, the stored value card transaction computer 136 may transmit details of transactions to the card issuers' authorization systems rather than authorization requests. Also, in some embodiments, the card issuer, the authorizing system, and the transaction computer are part of the same entity and, in such an embodiment, there would be no a card issuers' authorization systems 160 or the card issuers' authorization systems 160 would be under common control with the other components of the stored value card transaction computer 136 (for example, a commonly owned and operated computing system, that may be centralized (e.g., part of a centralized data center) and/or distributed within a commonly owned or controlled system or network). Furthermore, it should be noted that although components associated with the stored value card transaction computer 136 (e.g., components POS interface 124-authorization component 126) are depicted as various components within a single data processing system for illustration and conceptual purposes, one or more of components POS interface 124-authorization component 126 could be implemented on separate computers, systems, or servers in a distributed data processing environment.

Figure 2:
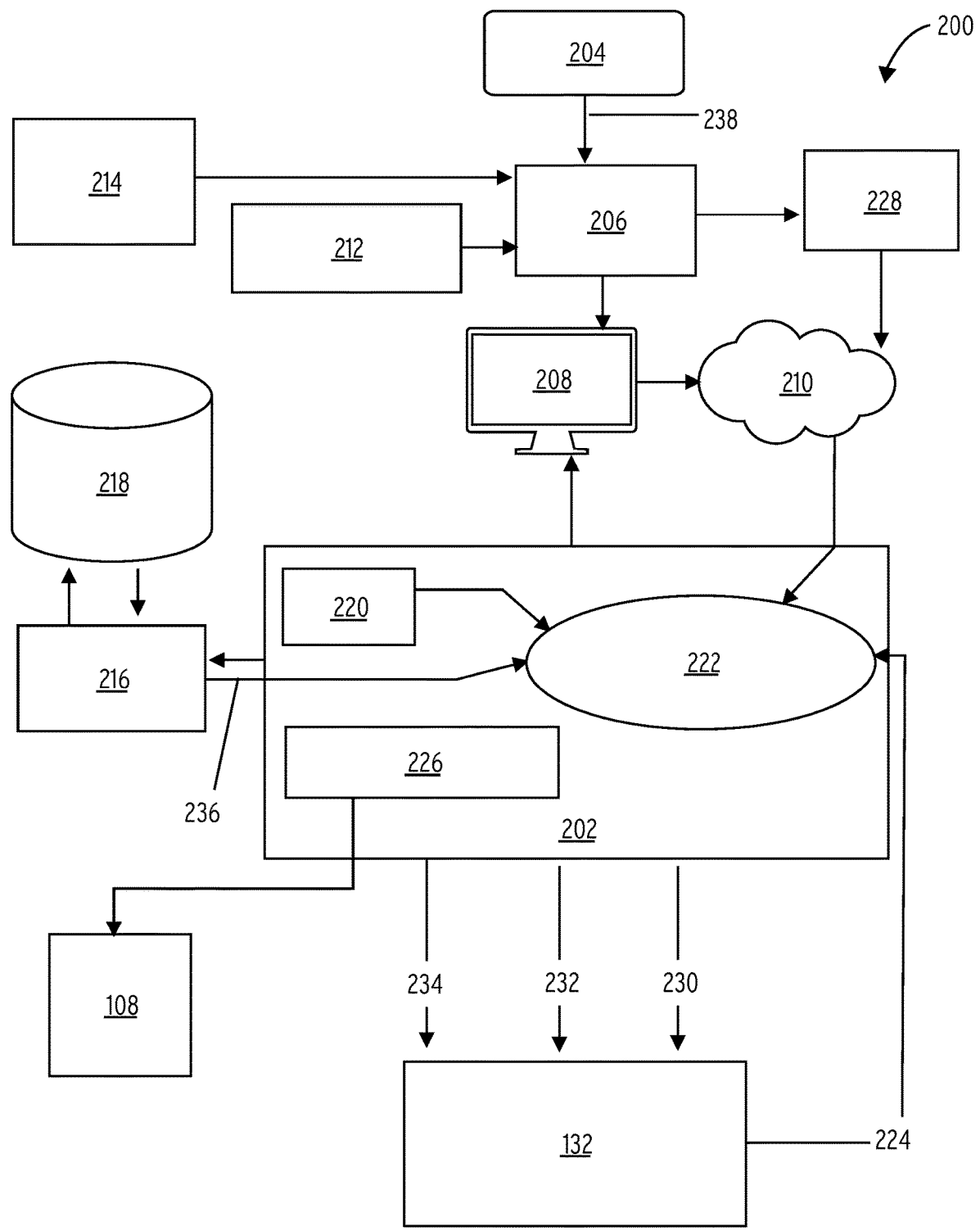
FIG. 2 illustrates an embodiment of a computer implemented system for facilitating a consumer's purchase transaction via a merchant's foreign website 200.

FIG. 2 illustrates an embodiment of a computer implemented system for facilitating a consumer's purchase transaction via a merchant's foreign website 200.

The user interface 206 may occur on a home computer, tablet, cell phone, laptop or other consumer device.

The computer implemented system for facilitating a consumer's purchase transaction via a merchant's foreign website 200 comprises a point of sale component 108, a card issuers' card issuer authorization system 132, a stored value card transformation computer 202, a stored value card 204, a user interface 206, a computer 208, a network 210, an output denomination 212, an input denomination 214, an exchange computer 216, an exchange datastore 218, an expiration time 220, a time-limited stored credit value 222, a response 224, an active stored credit 226, a kiosk 228, a devaluation request 230, a hold signal 232, a balance inquiry 234, a value rate 236, and an input credit 238.

The user interface 206 may be configured to allow the user to input an input denomination 214, output denomination 212 and stored value card 204. The stored value card 204 may take the form of a number, barcode, or digital identifier to identify it to the card issuers' card issuer authorization system 132. The user interface 206 collects the information and is triggered to send the input denomination 214, stored value card 204, and output denomination 212 over the network 210 to the stored value card transformation computer 202. The user interface 206 may similarly be utilized through a network-enabled kiosk, POS machine, or automated teller machine. The network 210 may be, for example, the Internet, a Public Switched Telephone Network (PSTN), or an independent dedicated network. The stored value card transformation computer 202 sends a request to the exchange computer 216 for a value rate between the input denomination 214 and the output denomination 212. The exchange computer 216 retrieves the value rate 236 from the exchange datastore 218 and transmits it to the stored value card transformation computer 202.

The value rate is combined with an expiration time 220 to create a time-limited stored credit value 222. The expiration time 220 may be pre-set, or may be retrieved or calculated from the exchange computer 216. The time-limited stored credit value 222 may then be transformed into active stored credit 226 within the amount of time specified by the expiration time 220 used to generate the time-limited stored credit value 222. The system may utilize the time-limitation property of the time-limited stored credit value 222 to trigger an alert requiring additional action by the user or may invalidate the time-limited stored credit value 222, requiring the re-generation of the time-limited stored credit value 222. The stored value card transformation computer 202 may send a balance inquiry 234 to the card issuers' card issuer authorization system 132 to ensure proper funding to cover the amount of the time-limited stored credit value 222, the stored value card transformation computer 202 may also send a hold signal 232 to prevent the funds from being used. The stored value card transformation computer 202 may then send a devaluation request 230 to the card issuers' card issuer authorization system 132. The response 224 to the devaluation request 230 may trigger the stored value card transformation computer 202 to remove the time-limitation property from the time-limited stored credit value 222 and transform it into the active stored credit 226. The active stored credit 226 may then be used, for example, through a point of sale component 108, or via a website.

Figure 3:
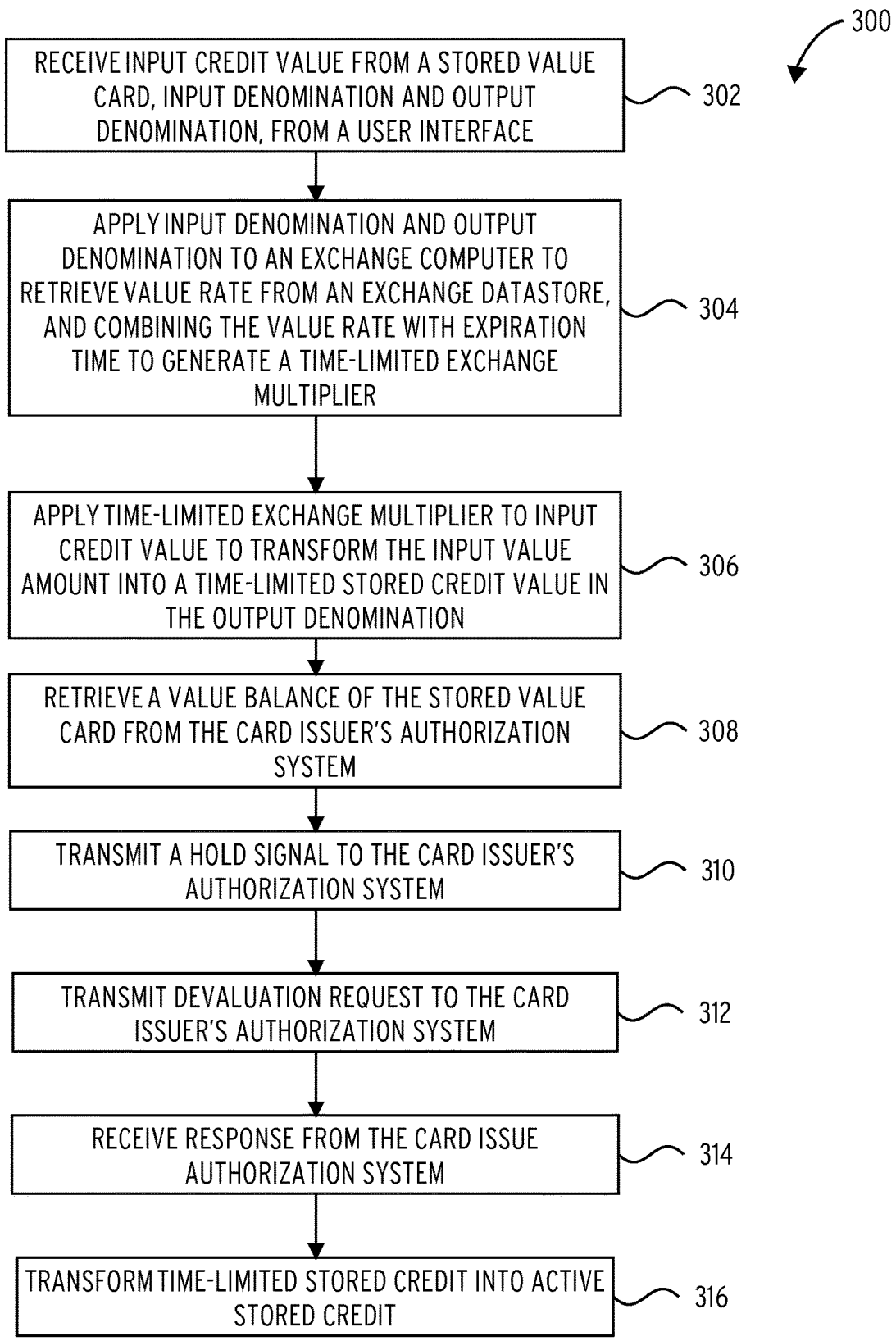
FIG. 3 illustrates an embodiment of a process 300.

Referring to FIG. 3, a process 200 comprises an input credit value from a stored value card, an input denomination and an output denomination, is received in a stored value card transformation computer, from a user interface (block 302).

The input denomination and the output denomination is applied to an exchange computer to retrieve a value rate from an exchange datastore, the value rate is combined with an expiration time to generate a time-limited exchange multiplier (block 304).

The time-limited exchange multiplier is applied to the input credit value to transform the input value amount into a time-limited stored credit value in the output denomination (block 306).

A value balance of the stored value card is retrieved from the card issuer's authorization system (block 308).

A hold signal is transmitted to the card issuer's authorization system (block 310).

A devaluation request is transmitted to the card issuer's authorization system (block 312).

A response is received from the card issue authorization system (block 314).

The time-limited stored credit is transformed into active stored credit (block 316).

A computer implemented method for facilitating a consumer's purchase transaction via a merchant's foreign website may include receiving in a stored value card transformation computer, an input credit value from a stored value card, an input denomination and an output denomination, from a user interface. The input denomination and the output denomination may be applied to an exchange computer to retrieve a value rate from an exchange datastore, and then combine the value rate with an expiration time to generate a time-limited exchange multiplier. The time-limited exchange multiplier may be applied to the input credit value to transform the input value amount into a time-limited stored credit value in the output denomination. A value balance of the stored value card may then be retrieved from the card issuer's authorization system. The value balance may be retrieved by multiple parties, e.g., the party or parties performing the actions at blocks 306 and/or 310 of FIG. 3, including a financial institution. A hold signal may be transmitted to the card issuer's authorization system, then a devaluation request may be transmitted to the card issuer's authorization system. A response may be received from the card issue authorization system, which may trigger the transformation of the time-limited stored credit into active stored credit. A target value of the active stored credit may be used to calculate the input credit value. The expiration of the time-limited stored credit value may trigger an alert on the user interface. The transformation of the input credit value into the time-limited stored credit value may generate a quote notification on the user interface. The user interface may be automatically populated with the stored value card's current balance as the input credit value. The input denomination May be automatically populated on the user interface based on a user's access location. The user interface may occur on a personal computer or mobile device, or on a point of sale terminal. The card issuer may be automatically identified from a list of issuers. The transformation of the time-limited stored credit may trigger a user notification to be generated on a user interface. A transaction fee may be added to the input credit value in the hold signal and devaluation request and excluded from the active stored credit. The user interface may be configured for the selection of a target country to automatically populate the output denomination. The user interface may be configured for the selection of an origin country to automatically populate the input denomination.

Figure 4:
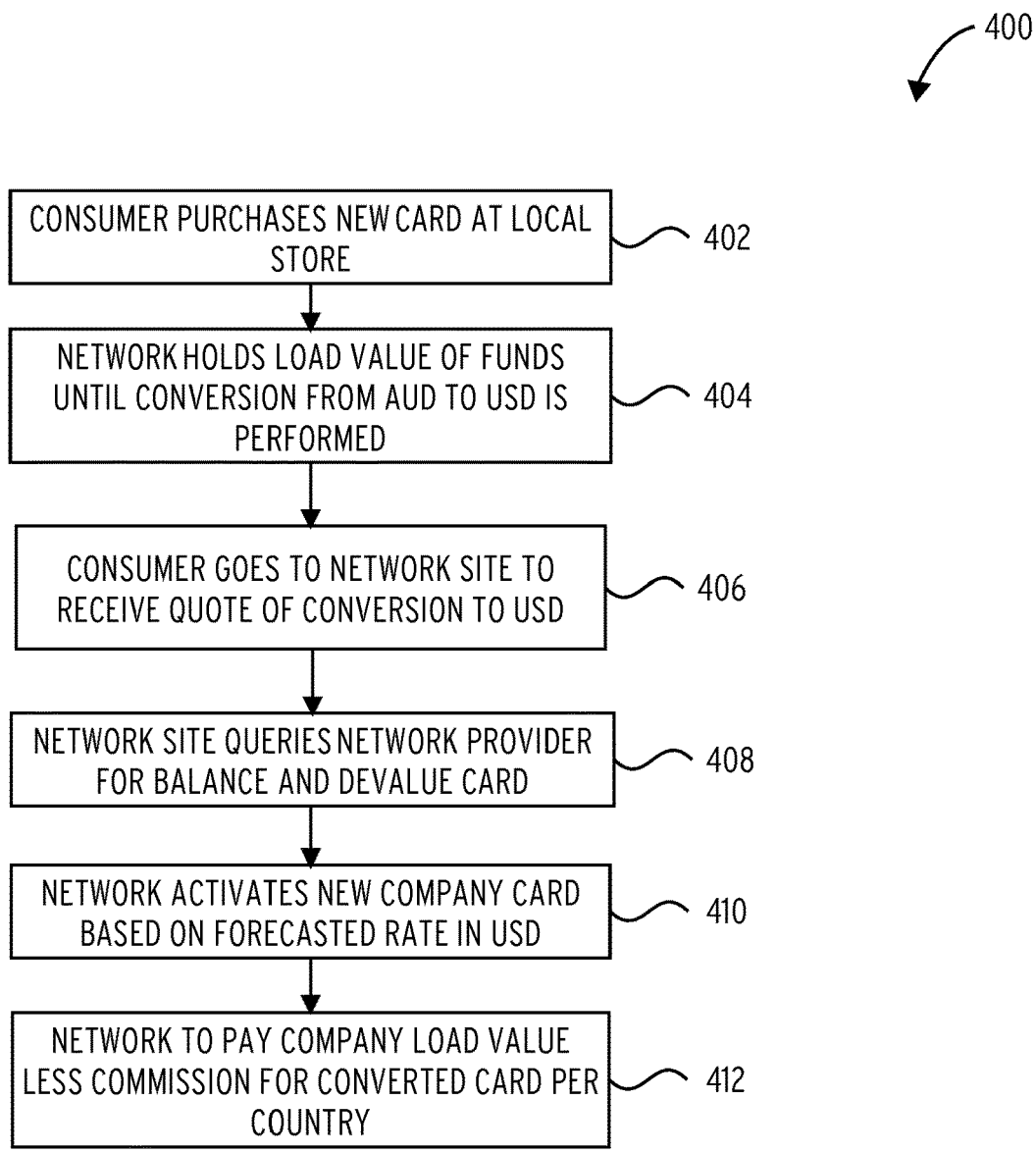
FIG. 4 illustrates an embodiment of a process 400.

Referring to FIG. 4, the process 400 comprises a stored value card is purchased at a local store (block 402).

Load value of funds is held until conversion is performed (block 404).

Consumer uses network site to receive quote of conversion to foreign currency (block 406).

Network site queries network provider for balance and devalues card (block 408).

Network activates new card based on forecasted rate in foreign denomination (block 410).

Network pays company load value less commission for converted card (block 412).

Figure 5:
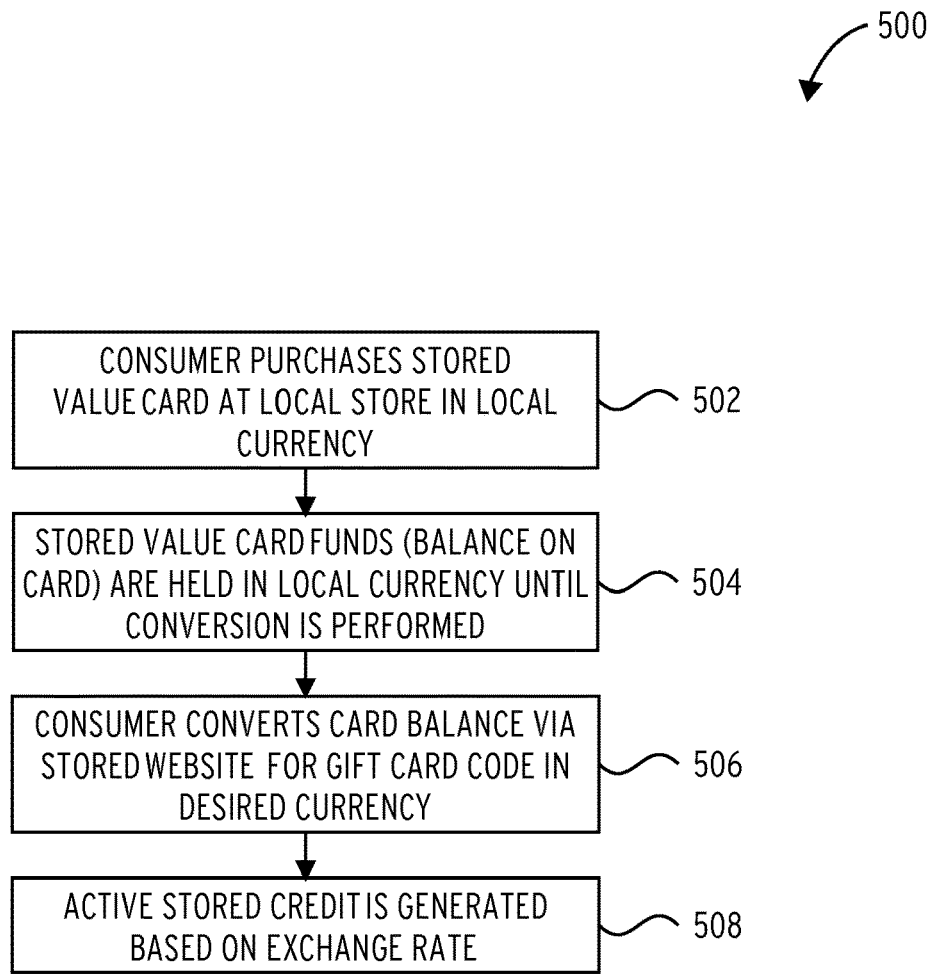
FIG. 5 illustrates an embodiment of a process 500.

Referring to FIG. 5, a process 500 comprises a stored value card is purchased by a consumer at a local store (block 502).

Stored value card funds are held in consumer's local currency until conversion is performed (block 504).

Consumer converts stored value card balance via website for gift card code in foreign currency (block 506).

Active stored credit is generated based on exchange rate (block 508).

Figure 6:
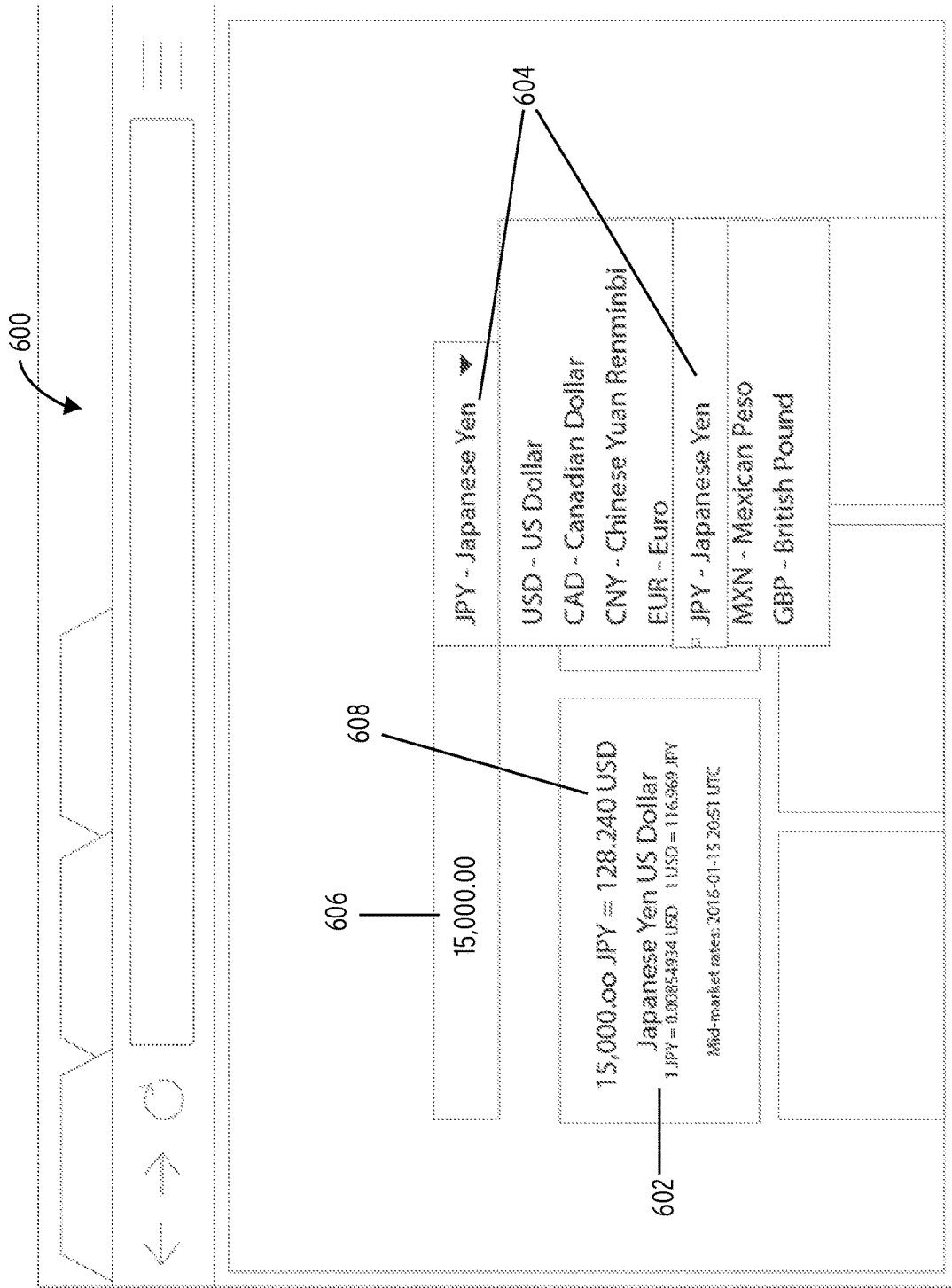
FIG. 6 illustrates an embodiment of a user interface 600.

FIG. 6 illustrates an embodiment of a user interface 600.

The user interface 600 comprises an exchange multiplier 602, an input denomination 604, an input credit value 606, and a time-limited stored credit 608.

The input denomination 604 may be selected by the user, and the value of the input denomination 604 may be used with the input credit value 606 to configure the exchange computer 216 to retrieve an exchange multiplier 602 to generate a time-limited stored credit 608.

Figure 7:
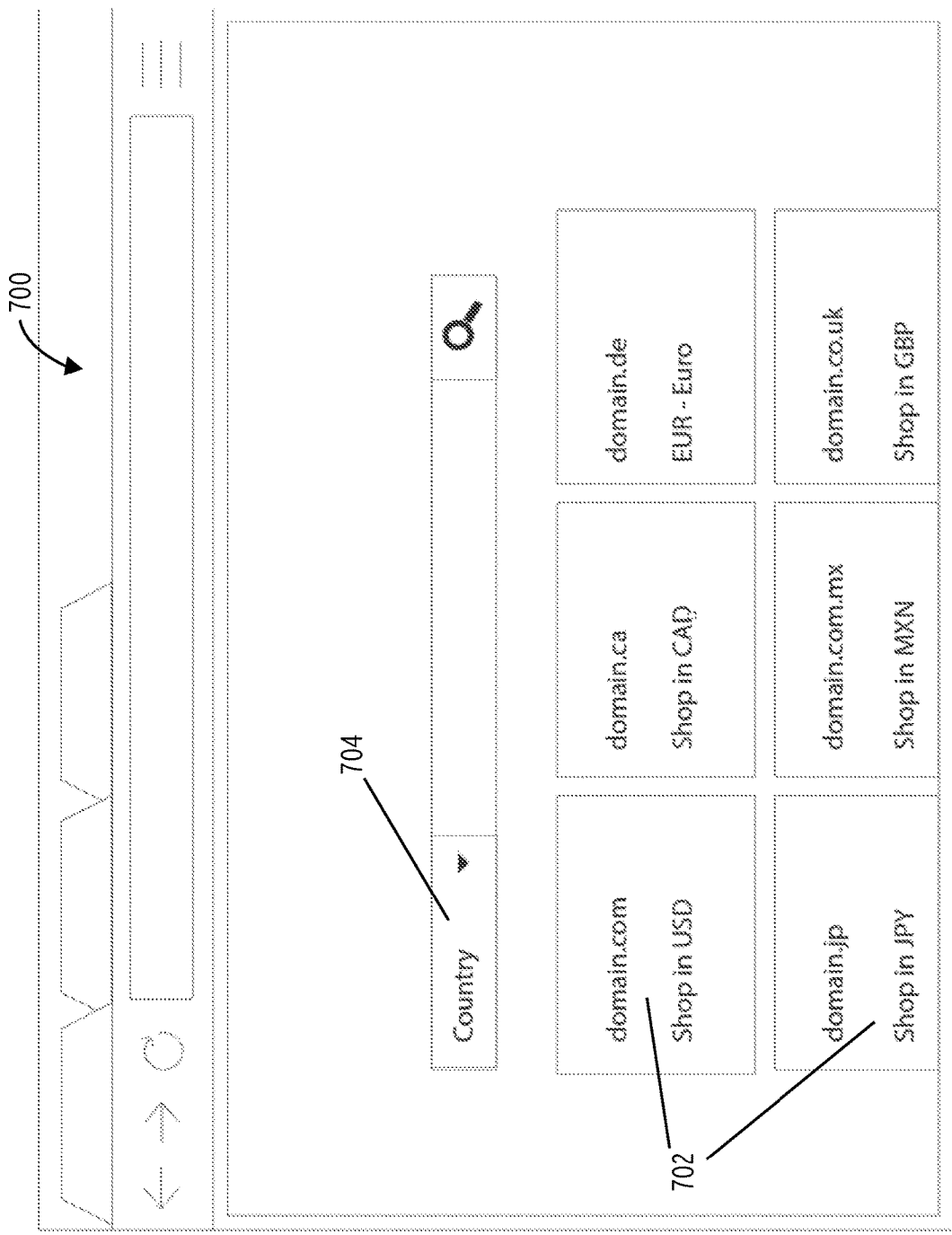
FIG. 7 illustrates an embodiment of a user interface 700.

FIG. 7 illustrates an embodiment of a user interface 700.

The user interface 700 comprises a targeted country 702 and an origin country 704. The origin country 704 may be used to automatically set the input denomination by selecting the national currency of the selected country. The targeted country 702 may be indicated and/or retailer may be selected and used to automatically select the national currency of the selected country as the output denomination.

Figure 8:
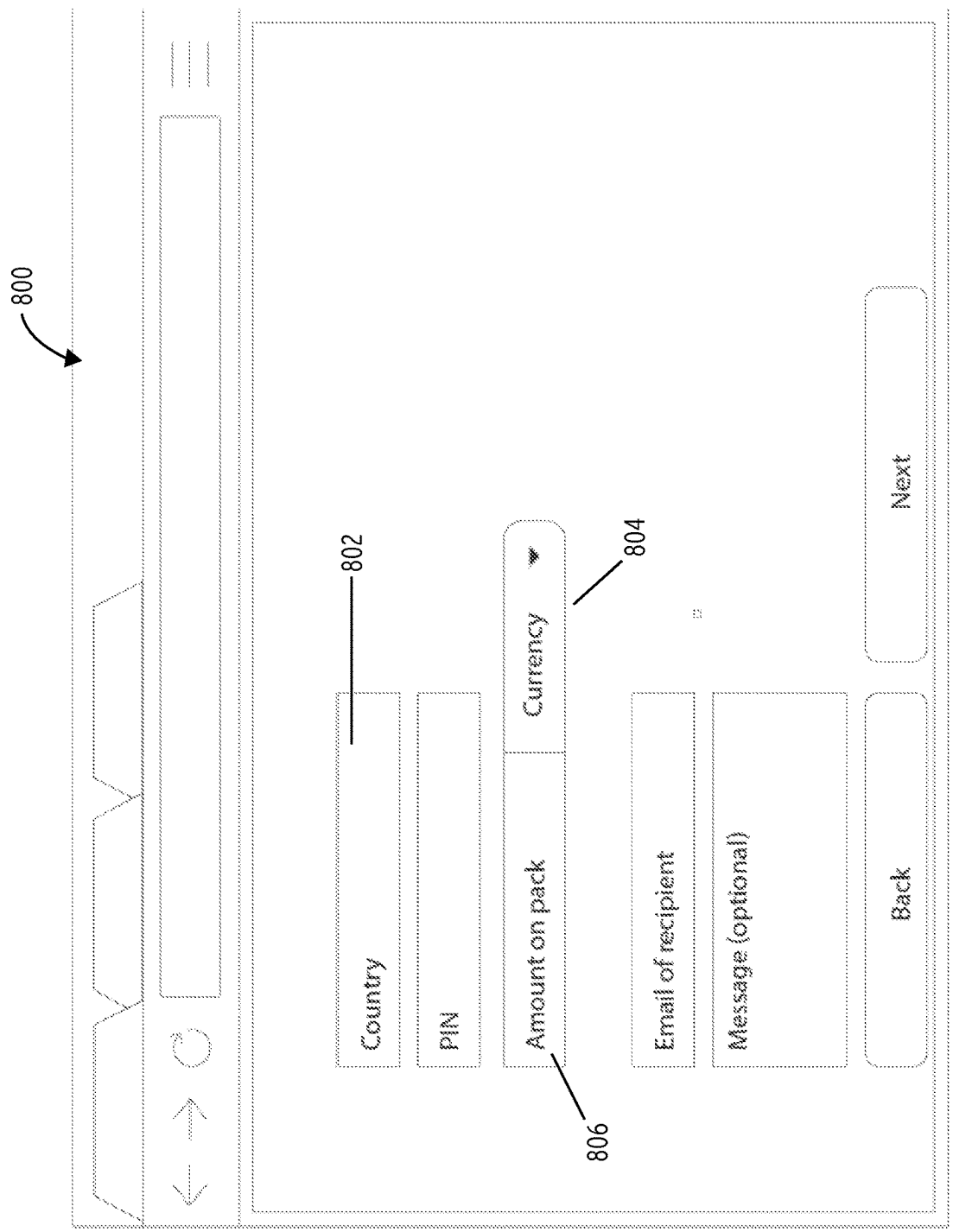
FIG. 8 illustrates an embodiment of a user interface 800.

FIG. 8 illustrates an embodiment of a user interface 800.

The user interface 800 comprises an origin country 802, an output denomination 804, and a target value 806.

The target value 806 may be used to configure the exchange computer 216 with the output denomination 804 and the origin country 802 to reverse-calculate the necessary input credit value to achieve the desired target value 806 as an active stored credit.

The FIG. 9 illustrates an embodiment of a user interface 900.

The user interface 900 comprises a transaction fee 902, an input credit value 904, a time-limited stored credit 906, a merchants foreign website 908, a target country 910, and an item 912.

The system and method may generate alerts requiring confirmation by the user. The confirmation may need to be indicated by the user in order to process the transaction in the time limit indicated in the time-limited stored credit. The system and method may configure a user interface to display an input credit value 904, with the transaction fee 902. The interface may also display the time-limited stored credit 906, merchants foreign website 908 and target country 910.

Figure 10:
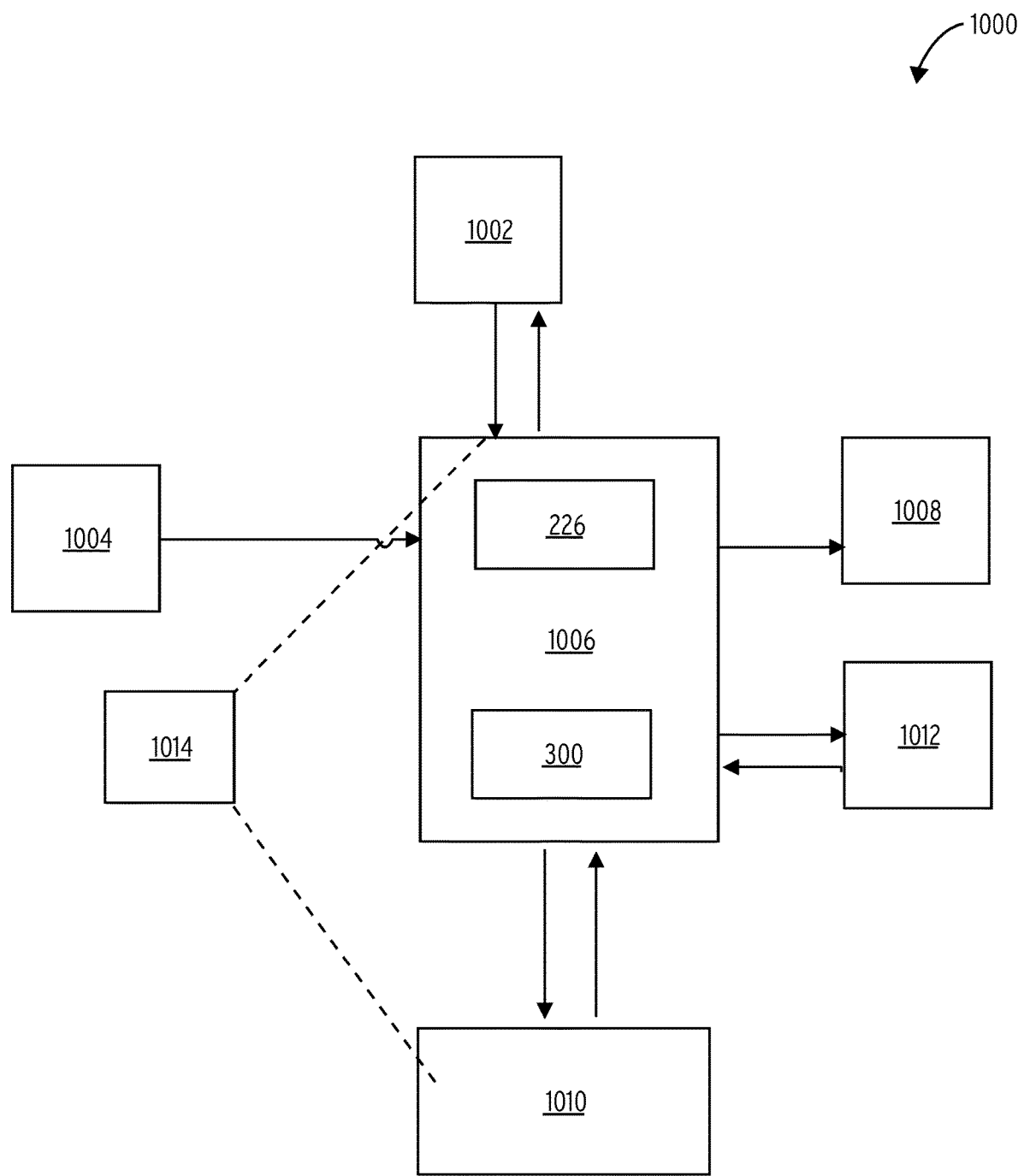
FIG. 10 illustrates an embodiment of a digital apparatus 1000 to implement components and process steps of the system described herein.

FIG. 10 illustrates an embodiment of a digital apparatus 1000 to implement components and process steps of the system described herein.

Input devices 1004 comprise transducers that convert physical phenomenon into machine internal signals, typically electrical, optical or magnetic signals. Signals may also be wireless in the form of electromagnetic radiation in the radio frequency (RF) range but also potentially in the infrared or optical range. Examples of input devices 1004 are keyboards which respond to touch or physical pressure from an object or proximity of an object to a surface, mice which respond to motion through space or across a plane, microphones which convert vibrations in the medium (typically air) into device signals, scanners which convert optical patterns on two or three dimensional objects into device signals. The signals from the input devices 1004 are provided via various machine signal conductors (e.g., busses or network interfaces) and circuits to memory 1006.

The memory 1006 is typically what is known as a first or second level memory device, providing for storage (via configuration of matter or states of matter) of signals received from the input devices 1004, instructions and information for controlling operation of the CPU 1002, and signals from storage devices 1010.

The memory 1006 and/or the storage devices 1010 may store computer-executable instructions and thus forming logic 1014 that when applied to and executed by the CPU 1002 implement embodiments of the processes disclosed herein.

Information stored in the memory 1006 is typically directly accessible to the CPU 1002 of the device. Signals input to the device cause the reconfiguration of the internal material/energy state of the memory 1006, creating in essence a new machine configuration, influencing the behavior of the digital apparatus 1000 by affecting the behavior of the CPU 1002 with control signals (instructions) and data provided in conjunction with the control signals.

Second or third level storage devices 1010 may provide a slower but higher capacity machine memory capability. Examples of storage devices 1010 are hard disks, optical disks, large capacity flash memories or other non-volatile memory technologies, and magnetic memories.

The CPU 1002 may cause the configuration of the memory 1006 to be altered by signals in storage devices 1010. In other words, the CPU 1002 may cause data and instructions to be read from storage devices 1010 in the memory 1006 from which may then influence the operations of CPU 1002 as instructions and data signals, and from which it may also be provided to the output devices 1008. The CPU 1002 may alter the content of the memory 1006 by signaling to a machine interface of memory 1006 to alter the internal configuration, and then converted signals to the storage devices 1010 to alter its material internal configuration. In other words, data and instructions may be backed up from memory 1006, which is often volatile, to storage devices 1010, which are often non-volatile.

Output devices 1008 are transducers which convert signals received from the memory 1006 into physical phenomenon such as vibrations in the air, or patterns of light on a machine display, or vibrations (i.e., haptic devices) or patterns of ink or other materials (i.e., printers and 3-D printers).

The network interface 1012 receives signals from the memory 1006 and converts them into electrical, optical, or wireless signals to other machines, typically via a machine network. The network interface 1012 also receives signals from the machine network and converts them into electrical, optical, or wireless signals to the memory 1006.

What is claimed is:

1. A computer implemented method for facilitating a consumer's purchase transaction via a merchant's foreign website performed by a stored value card transformation computer having a processor and a memory storing instructions which, when executed by the processor, causes the stored value card transformation computer to perform the method comprising:

receiving in the stored value card transformation computer, via an input device, wherein the input device converts physical phenomenon into machine internal signals, and wherein the input device comprises a keyboard, a mouse, a microphone, a scanner, or combinations thereof, an input credit value from a stored value card, an input denomination and an output denomination, from a user interface;

applying the input denomination and the output denomination to an exchange computer to retrieve a value rate from an exchange datastore, and combining the value rate with an expiration time to generate a time-limited exchange multiplier;

applying the time-limited exchange multiplier to the input credit value to transform the input credit value into time-limited stored credit in the output denomination;

retrieving a value balance of the stored value card from a card issuer's authorization system;

transmitting a devaluation request to the card issuer's authorization system;

receiving a response from the card issuer's authorization system; and transforming the time-limited stored credit into active stored credit.

2. The computer implemented method for facilitating a consumer's purchase transaction via a merchant's foreign website of claim 1, wherein a target value of the active stored credit is used to calculate the input credit value.

3. The computer implemented method for facilitating a consumer's purchase transaction via a merchant's foreign website of claim 1, wherein expiration of the time-limited stored credit value triggers an alert on the user interface.

4. The computer implemented method for facilitating a consumer's purchase transaction via a merchant's foreign website of claim 1, wherein transforming the input credit value into the time-limited stored credit generates a quote notification on the user interface.

5. The computer implemented method for facilitating a consumer's purchase transaction via a merchant's foreign website of claim 1, wherein the user interface is automatically populated with the stored value card's current balance as the input credit value.

6. The computer implemented method for facilitating a consumer's purchase transaction via a merchant's foreign website of claim 1, wherein the input denomination is automatically populated on the user interface based on a user's access location.

7. The computer implemented method for facilitating a consumer's purchase transaction via a merchant's foreign website of claim 1, wherein the user interface occurs on a personal computer or mobile device.

8. The computer implemented method for facilitating a consumer's purchase transaction via a merchant's foreign website of claim 1, wherein the user interface occurs on a point of sale terminal.

9. The computer implemented method for facilitating a consumer's purchase transaction via a merchant's foreign website of claim 1, wherein the card issuer is automatically identified from a list of issuers.

10. The computer implemented method for facilitating a consumer's purchase transaction via a merchant's foreign website of claim 1, wherein the transformation of the time-limited stored credit triggers a user notification to be generated on a the user interface.

11. The computer implemented method for facilitating a consumer's purchase transaction via a merchant's foreign website of claim 1, further comprising transmitting a hold signal to the card issuer's authorization system, wherein a transaction fee is added to the input credit value in the hold signal and the devaluation request and excluded from the active stored credit.

12. The computer implemented method for facilitating a consumer's purchase transaction via a merchant's foreign website of claim 1, wherein the user interface may be configured for the selection of a target country to automatically populate the output denomination.

13. The computer implemented method for facilitating a consumer's purchase transaction via a merchant's foreign website of claim 1, wherein the user interface may be configured for the selection of an origin country to automatically populate the input denomination.

14. A computing apparatus for facilitating a consumer's purchase transaction via a merchant's foreign website, the computing apparatus comprising:
an input device, wherein the input device converts physical phenomenon into machine internal signals, and wherein the input device comprises a keyboard, a mouse, a microphone, a scanner, or combinations thereof;
a processor; and
a memory storing instructions that, when executed by the processor, configure the apparatus to:
receive in a stored value card transformation computer, an input credit value from a stored value card, an input denomination and an output denomination, from a user interface;
apply the input denomination and the output denomination to an exchange computer to retrieve a value rate from an exchange datastore, and combining the value rate with an expiration time to generate a time-limited exchange multiplier;
apply the time-limited exchange multiplier to the input credit value to transform the input credit value into time-limited stored credit in the output denomination;
retrieve a value balance of the stored value card from a card issuer's authorization system;
transmit a devaluation request to the card issuer's authorization system;
receive a response from the card issuer's authorization system; and
transform the time-limited stored credit into active stored credit.

15. The computing apparatus of claim 14, wherein a target value of the active stored credit is used to calculate the input credit value.

16. The computing apparatus of claim 14, wherein expiration of the time-limited stored credit triggers an alert on the user interface.

17. The computing apparatus of claim 14, wherein transforming the input credit value into the time-limited stored credit generates a quote notification on the user interface.

18. The computing apparatus of claim 14, wherein the user interface is automatically populated with the stored value card's current balance as the input credit value.

19. The computing apparatus of claim 14, wherein the user interface is automatically populated with the input denomination of the stored value card based on the user's access location.

20. The computing apparatus of claim 14, wherein the user interface occurs on a personal computer or mobile device.

21. The computing apparatus of claim 14, wherein the user interface occurs on a point-of-sale terminal.

22. The computing apparatus of claim 14, wherein the card issuer is automatically identified from a list of issuers.

23. The computing apparatus of claim 14, wherein the transformation of the time-limited stored credit triggers a user notification to be generated on the user interface.

24. The computing apparatus of claim 14, wherein the apparatus further transmits a hold signal to the card issuer's authorization system, wherein a transaction fee is added to the input credit value in the hold signal, and wherein the devaluation request and excluded from the active stored credit.

25. The computing apparatus of claim 14, wherein the user interface may be configured for the selection of a target country to automatically populate the output denomination.

26. The computing apparatus of claim 14, wherein the user interface may be configured for the selection of an origin country to automatically populate the input denomination.

* * * * *